US008577379B2

(12) United States Patent
Shi et al.

(10) Patent No.: US 8,577,379 B2
(45) Date of Patent: Nov. 5, 2013

(54) METHOD OF HANDLING AUTOMATIC CALL ORIGINATION AND SYSTEM DETERMINATION ON MULTI-NETWORK MOBILE DEVICES

(75) Inventors: Guangming Shi, San Diego, CA (US); Andrew Torchalski, Longmont, CO (US); Rekha Iyer, San Diego, CA (US); Venkat Tangirala, San Diego, CA (US); Ting Mui Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 10/752,607

(22) Filed: Jan. 6, 2004

(65) Prior Publication Data

US 2005/0070291 A1    Mar. 31, 2005

Related U.S. Application Data

(60) Provisional application No. 60/506,342, filed on Sep. 25, 2003, provisional application No. 60/506,362, filed on Sep. 25, 2003, provisional application No. 60/506,224, filed on Sep. 26, 2003.

(51) Int. Cl.
*H04W 40/00* (2009.01)

(52) U.S. Cl.
USPC ............ 455/445; 455/435.3; 455/432.1; 455/418; 455/417; 455/410; 455/414.1; 455/552.1; 455/565; 455/186.1; 455/550.1; 455/575.1; 455/404.1; 455/414.4; 455/521; 455/512

(58) Field of Classification Search
USPC .............. 455/407, 408, 127.4, 445, 418, 433, 455/558, 559, 411, 552, 553, 435, 432; 379/88.17
See application file for complete search history.

(56) References Cited

U.S. PATENT DOCUMENTS 5,884,193 A * 3/1999 Kaplan ..................... 455/565
5,915,224 A * 6/1999 Jonsson ................... 455/552.1
(Continued)

FOREIGN PATENT DOCUMENTS

EP    0724371    7/1996
EP    1271881    1/2003
(Continued)

OTHER PUBLICATIONS

International Search Report and Written Opinion—PCT/US2004/030104, International Search Authority—European Patent Office—Jan. 17, 2005.

(Continued)

*Primary Examiner* — Willie J Daniel, Jr.
(74) *Attorney, Agent, or Firm* — Kristine U. Ekwueme

(57) ABSTRACT

Systems and techniques are disclosed relating to communications. The systems and techniques include receiving an origination request for a call, determining whether the call is allowed on each of a plurality of wireless networks as a function of the origination request, and originating the call over a network selected from a plurality of networks. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

32 Claims, 5 Drawing Sheets

(56) References Cited

U.S. PATENT DOCUMENTS

| | | |
|---|---|---|
| 5,999,811 A | 12/1999 | Mölne |
| 6,125,283 A * | 9/2000 | Kolev et al. ............... 455/552.1 |
| 6,208,872 B1 * | 3/2001 | Schmidt ...................... 455/518 |
| 6,334,052 B1 * | 12/2001 | Nordstrand ................. 455/411 |
| 6,766,159 B2 * | 7/2004 | Lindholm ................. 455/404.1 |
| 6,889,059 B1 * | 5/2005 | Fragola ....................... 455/558 |
| 6,891,811 B1 * | 5/2005 | Smith et al. ................. 370/310 |
| 7,010,296 B2 * | 3/2006 | Sakai et al. ............... 455/432.1 |
| 2002/0039892 A1 | 4/2002 | Lindell |
| 2002/0098874 A1 * | 7/2002 | Zirul et al. .................. 455/564 |
| 2003/0103607 A1 * | 6/2003 | Feakes ..................... 379/88.17 |

FOREIGN PATENT DOCUMENTS

| | | |
|---|---|---|
| JP | 10327463 | 12/1998 |
| JP | 11262064 | 9/1999 |
| JP | 2003526296 | 9/2003 |
| RU | 2111619 | 5/1998 |
| RU | 2134489 | 8/1999 |
| WO | 9501070 | 1/1995 |
| WO | WO0167796 A2 | 9/2001 |

OTHER PUBLICATIONS

Taiwan Search Report—TW093128868—TIPO—Mar. 24, 2012.

* cited by examiner

METHOD OF HANDLING AUTOMATIC CALL ORIGINATION AND SYSTEM DETERMINATION ON MULTI-NETWORK MOBILE DEVICES

CROSS REFERENCE TO RELATED APPLICATIONS

This application is related to and claims the benefit of the filing date of U.S. provisional application Ser. No. 60/506,342, by Guangming Shi, et. al., filed on Sep. 25, 2003, entitled "Method of Handling Automatic Call Origination And System Determination of Multi-Mode and Multi-SIM/U-SIM/R-UIM Card Mobile Devices"; U.S. provisional application Ser. No. 60/506,362, by Guangming Shi, et. al., filed on Sep. 25, 2003, entitled "Alternative Method of Handling Automatic Call Origination And System Determination of Multi-Mode and Multi-SIM/U-SIM/R-UIM Card Mobile Devices"; and U.S. provisional application Ser. No. 60/506,224, by Guangming Shi, et. al., filed on Sep. 26, 2003, entitled "Method of Handling Automatic Call Origination And System Determination of Multi-Mode and Multi-SIM/U-SIM/R-UIM Card Mobile Devices," the contents of all of which are incorporated herein by reference.

BACKGROUND

1. Field

The present disclosure relates to systems and techniques for originating calls in multi-mode network environments.

2. Background

The demand for wireless services has led to the development of an ever increasing number of wireless networks. One such network is a CDMA 1X (Code-Division Multiple Access) system which supports wireless voice and data services using spread-spectrum techniques. A competing network which has become the de facto standard in Europe and Asia is GSM (Global System for Mobile Communications). Unlike CDMA 1X, GSM uses narrowband TDMA (Time-Division Multiple Access) to support wireless voice and data services. Other networks that have evolved over the years include CDMA 1xEV-DO for high speed data services based on spread-spectrum technology, GPRS (General Packet Radio Service) which supports high speed data services with data rates suitable for e-mail and web browsing applications, and UMTS (Universal Mobile Telecommunications System) which can deliver broadband voice and data for audio and video applications.

In general, communications devices that are compatible with one wireless network are incompatible with other wireless networks. This is due, in part, to each network's use of its own unique protocols for communicating between compatible communications devices. In addition, each wireless network may have its own unique set of services. For example, CDMA 1X, GSM and UMTS support both wireless voice and data services whereas CDMA 1xEV-DO and GPRS are limited to wireless data services. Even wireless networks that support the same services may not be compatible with one another due to different operating parameters.

These disparate networks have created a series of islands of wireless service throughout the geographic landscape, each with its own unique set of protocols, services, and data rates. Accordingly, there is a need for a methodology wherein a user can communicate with different wireless networks in a simple and efficient manner. The specific methodology should provide an ability to originate a call on any one of the multiple networks.

SUMMARY

In one aspect of the invention, a method of communications includes receiving an origination request for a call, selecting a communications network from a plurality of communications networks, accessing information to determine as a function of the origination request and the information that the call is allowed on the selected communications network, and originating the call over the selected communications network.

In another aspect of the present invention, a method of communications includes receiving an origination request for a call, selecting a communications network from a plurality of communications networks, accessing information to determine as a function of the origination request and the information that the call is not allowed on the selected communications network, and preventing the call from being originated over the selected communications network.

In yet another aspect of the present invention, computer readable media embodying a program of instructions executable by a computer program may be configured to perform a method of communications, the method including receiving an origination request for a call, selecting a communications network from a plurality of communications networks, accessing information to determine as a function of the origination request and the information whether the call is allowed on the selected communications network, and originating the call over the selected communications network if the call is determined to be allowed, and preventing the call from being originated over the selected communications network if the call is determined not to be allowed.

In a further aspect of the present invention, a communications device includes an input device configured to receive an origination request for a call, a memory device for storing information, a processor configured to select a communications network from a plurality of communications networks, access the information and determine as a function of the origination request and the information whether the call is allowed on the selected communications network, originate the call over the selected communications network if the processor determines that the call is allowed, and prevent the call from being originated over the selected communications network if the processor determines that the call is not allowed.

In yet a further aspect of the present invention, a communications device includes means for receiving an origination request for a call, means for selecting a communications network from a plurality of communications networks, means for accessing information to determine as a function of the origination request and the information, whether the call is allowed on the selected communications network, means for originating the call over the selected communications network if the call is determined to be allowed, and means for preventing the call over the selected communications network if the call is determined not be allowed.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

An exemplary wireless communications device such as a cellular telephone or similar device can be used to communicate with various wireless networks. Access to these networks can be managed by the device in a way that is transparent to the user. More specifically, the communications device can automatically designate whether, and in what format, a call can be placed on each one of the various wireless networks, without the user needing to know which network the call is originated on or how the call origination request is handled for originating the call. The manner in which the wireless network is designated may vary from device to device, and those skilled in the art will readily be able to determine the selection criteria best suited for the particular application.

In one embodiment of the communications device, an algorithm or similar methodology can be used to determine whether a call is allowed on various wireless networks based on a call origination request by the user or a call origination request by an application such as a browser. The automatic formatting of the call origination request and selection of a compatible wireless network can then be made. Determination of whether a call is allowed on a particular network may be made as a function of user preferences. Preferences can be programmed into the communications device, such as by programming the device's communications card or cards, by the user before making the call. Alternatively, the user preferences can be set by the manufacturer at the factory or by the carriers, phone service or sales outlet before sale. Virtually any algorithm could be implemented to manage access to the various wireless networks. This concept can be extended to other wireless technologies including any satellite or terrestrial application.

Figure 1:
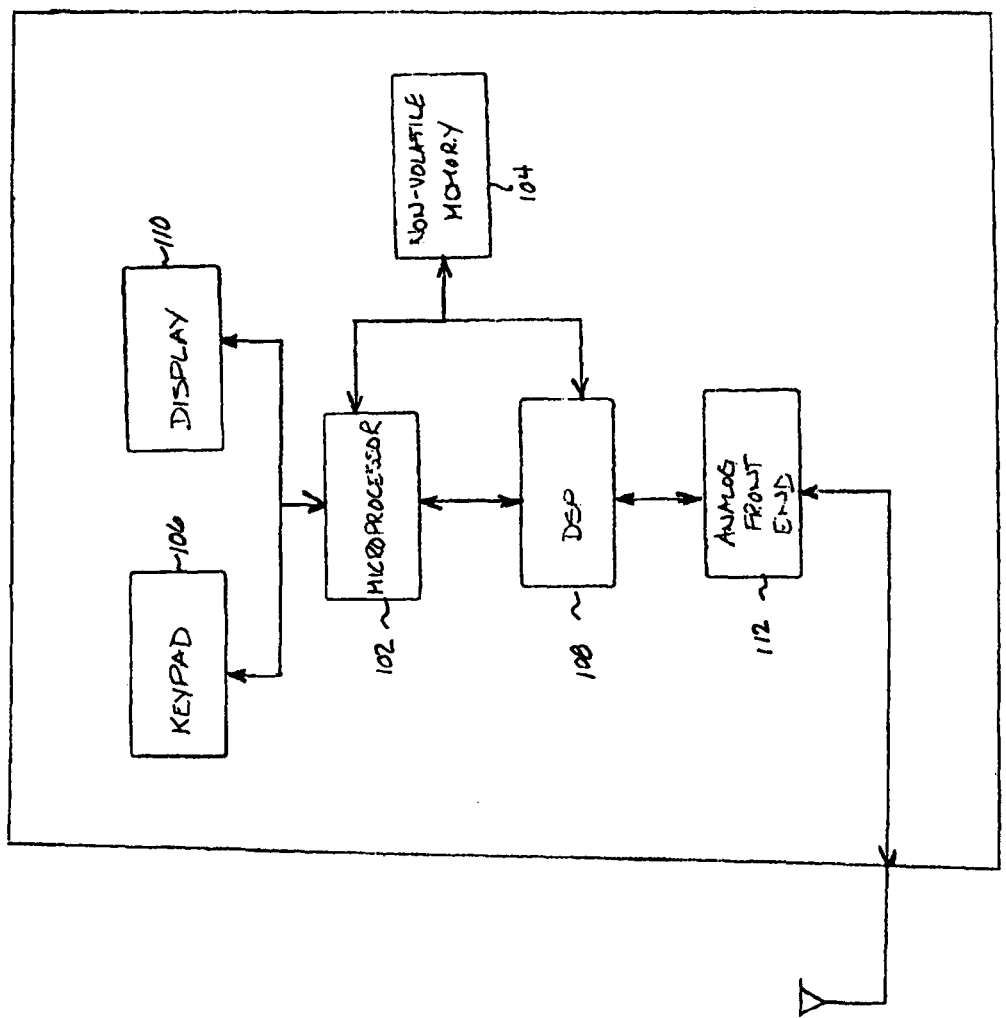
FIG. 1 is a functional block diagram of an exemplary hardware configuration to support a software based processor system operating in a multi-mode wireless communications device.

Network access in a wireless communications device can be managed with a software based processor system, or any other configuration known in the art. An exemplary hardware configuration for a software based processor system is shown in FIG. 1. The processor system has a microprocessor 102 at its core with non-volatile memory 104. Non-volatile memory may comprise memory that is resident on the communications device, or memory on a communications card that may be inserted into the communications device. The microprocessor 102 can provide a platform to run software programs that, among other things, manage call origination on various networks based on (1) the preferences of the user which can be programmed into the non-volatile memory 104; (2) other information indicative of whether a call is allowed on the various networks; and (3) the protocol compatibility of those networks with the call as originated by the user.

A digital signal processor (DSP) 108 can be implemented with an embedded communications software layer which runs application specific algorithms to reduce the processing demands on the microprocessor 102. For example, during call origination, the DSP 108 can be used to provide encoding and modulation of text messages from the keypad 106 before those text messages are transmitted to a far end user through an analog front end 112. The DSP 108 can also provide decoding and demodulation of text messages from the far end user received through the analog front end 112 before presentation to a display 110. The software layer also interfaces the DSP hardware to the microprocessor 102 and may provide low level services such as allocation of resources to allow the higher level software programs to run.

The exemplary processor system supports user entry and editing functions. Such functions may be utilized, for example, to program user preferences into the communications device or its memory card(s). The user interface can be fully menu driven or implemented in any other fashion. In the menu driven user interface, on-screen options can be presented to display 110 in the form of a main menu for programming the communications device. From the main menu, the user can select an on-screen option for programming user network preferences through various keypad manipulations. Once this on-screen option is selected by the user, the microprocessor 102 retrieves a list of networks from the non-volatile memory 104 and presents the list to the display 114 in a sub-menu format. The sub-menu may contain a list of all networks supported by the communications device, or alternatively can display a list of networks for voice services separately from data services.

Figure 2:
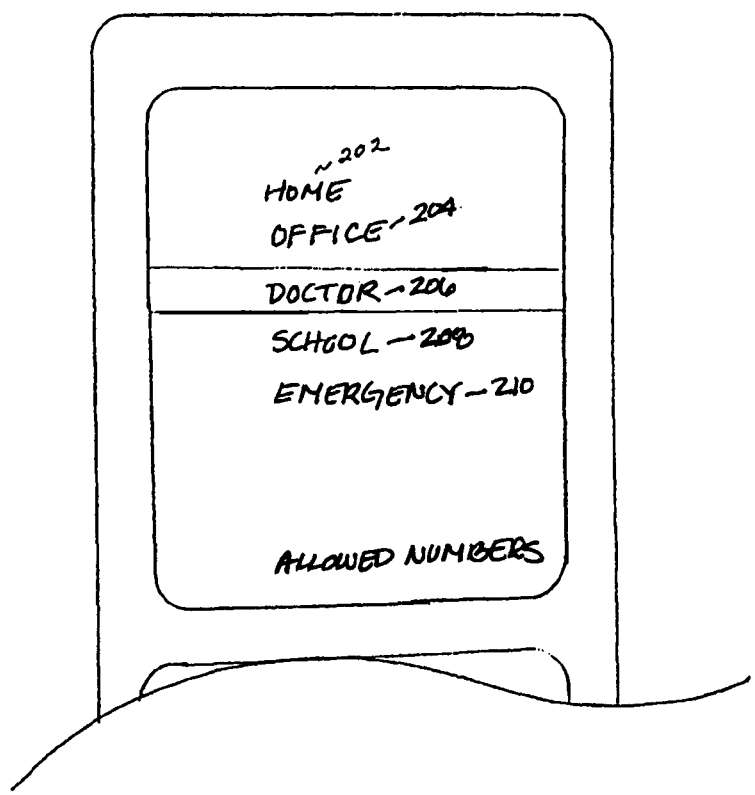
FIG. 2 is a top view of an exemplary communications device with a display presenting a sub-menu selection screen.

A sub-menu format is shown in FIG. 2 with an exemplary type of information for determining whether a call is allowed on a particular network. The "fixed dialing list" comprises all phone numbers allowed by an exemplary communications device or by a card within the communications device. In this example, each phone number is represented by a user-defined code that allows for easy identification and selection by the user when he desires to place a phone call. Thus, phone numbers represented by HOME 202, OFFICE 204, DOCTOR 206, SCHOOL 208 and EMERGENCY 210 are allowed in the illustrated example. However, any combination of phone numbers may be allowed according to the user preferences. It is also possible that a user may program a "block list," including numbers that are not allowed on a particular network. In that case, if a user dials a number that is located on the block list, the communications device will reject the call. It is understood that a communications device may contain multiple communications cards, thereby becoming constrained by multiple, different fixed dialing, block, or other such permission-driven lists. It is further understood that any one communications device may, because of multiple cards, be enabled to originate a call on a first network where the dialed phone number is represented on that card's fixed dialing list, but be restrained from originating the same call on a second network, where the dialed phone number is represented on that card's block list. Thus, for any dialing string input received by the communications device, each card must be tested for its ability to allow the call.

Figure 3:
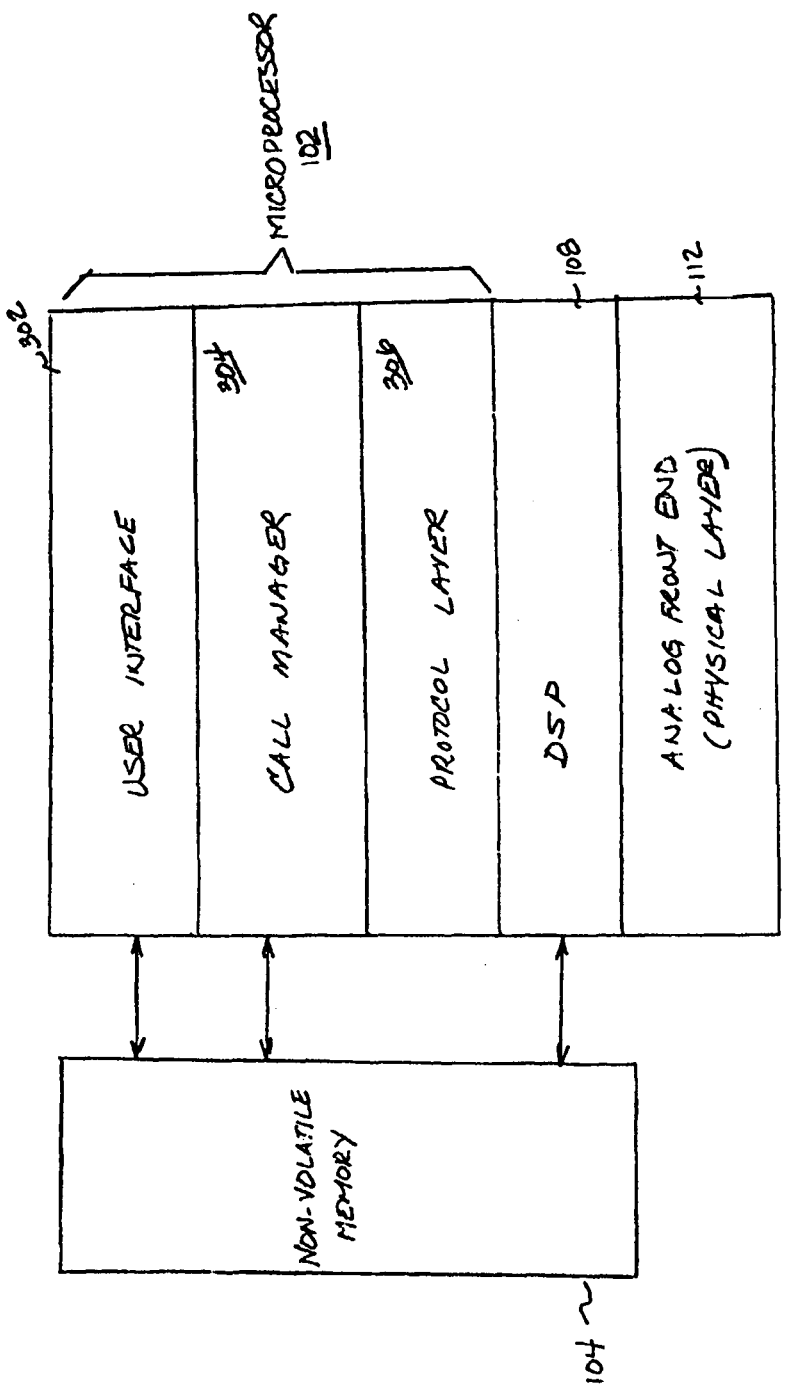
FIG. 3 is a functional block diagram of an exemplary multi-layer software architecture for the software based processor system of FIG. 1.

An exemplary microprocessor multi-layer software architecture is shown in FIG. 3. The software architecture includes a user interface 302, a call manager 304 and a protocol layer 306 running on a microprocessor platform. The DSP 108 and analog front end 112 are shown for completeness, but will not be discussed further. Alternatively, each software layer can be run on separate processors or any combination of processors. The processors can be internal to the communications device, or alternatively, one or more processors could be located in an external device such as a laptop computer connected to the communications device. As those skilled in the art will appreciate, the implementation details may vary depending on the particular communications application and the overall design constraints.

User interface 302 provides structure to the interaction between the user and the communications device. During the programming of user network preferences, the user interface 302 may be used to generate the menu and sub-menus presented to the display from data stored in the non-volatile memory 104. The user interface 302 may also be responsible for deleting, adding and reordering user preferred networks within the non-volatile memory 104 in response to menu and sub-menu selections.

The user interface 302 may be a software program, or set of programs, that sits as a layer above the call manager 304. The software programs can be applications such as a phone book, SAT (SIM Application Toolkit), SAT CC (SAT Call Control), SMS, browser, e-mail or any other software programs. When the user originates a call, or launches an application that initiates a call, the user interface 302 determines the parameters of the call from the keypad entries, including for example service parameters and dialing string input information. The service parameters typically include, among other things, the type of service requested. For example, the requested service can be a voice call, a data call, or any other service provided by the carrier. Dialing string input information typically includes data representing the numbers entered by a user who dialed a phone number on the keypad of the communications device. The user interface 302 may also include other service parameters such as the quality of service needed to support the call. For example, if the user initiates a video application, the user interface 202 may determine that the call requires a data rate of 64 kbits/s or higher.

The call manager 304 can be used to manage access to various networks in a way that is transparent to the user. Based on the parameters derived from the user's call origination request, the call manager 304 determines whether the call is allowed on each one of the various networks. The call manager 304 may also determine other network selection parameters, such as the service compatibility of all the networks supported by the communications device. Then, the determination of whether a call is allowed may be made for only those networks that are first determined to be compatible with the call. For example, if the communications device supports CDMA 1X, CDMA 1xEV-DO, GSM, GPRS, and UMTS networks, and the service requested is a video application, the call manager 304 may determine that only the CDMA 1xEV-DO and UMTS networks can support this application. In that event, the call manager 304 will limit its inquiry regarding whether the call is allowed to just those two compatible networks. The criteria used to determine whether a call is allowed on a particular network managed in a selection algorithm, which is explained in further detail below with reference to FIG. 5.

Figure 4:
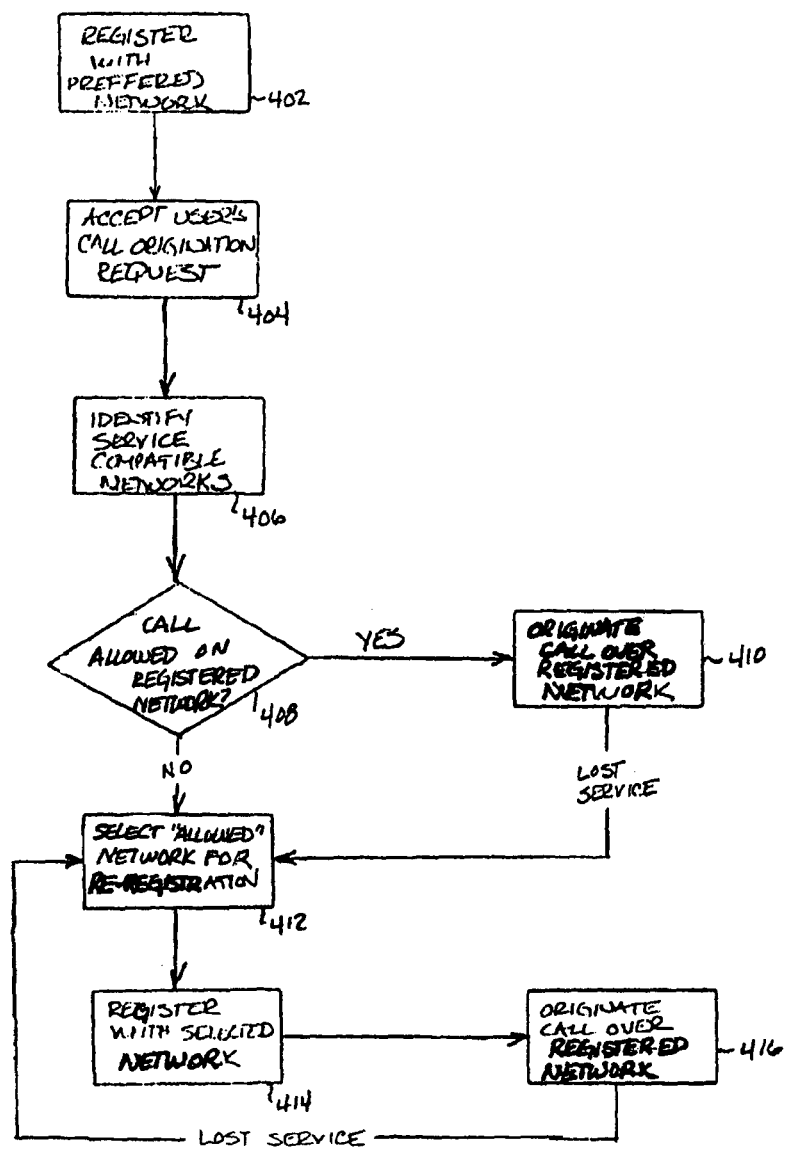
FIG. 4 is a flow diagram showing the function of an exemplary call manager operating within the multi-layer software architecture of FIG. 3.

FIG. 4 is a flow diagram showing the operation of the call manager. When power is first applied to the communications device, the call manager may attempt to register with the user preferred network stored in non-volatile memory in step 402. Once registered, the call manager accepts a call origination request from the user through the user interface in step 404. The call origination request includes various parameters such as service parameters (e.g. type of service requested by the user and the quality of service needed to support the call) and dialing string input information. In step 406, the call manager may identify the networks supported by the communications device that are service compatible with the call origination request. Alternatively, this step may be omitted, such that the determination of whether a call is allowed (explained below) may be made for each network, whether it is service compatible or not.

In step 408, the call manager determines whether the call identified in the call origination request is allowed on the network currently registered. This determination is made as a function of the output of an identification algorithm, the details of which are explained below with reference to FIG. 5. If the identification algorithm output indicates that the call is allowed on the registered network, the call manager attempts to originate a call on that network in step 410. If the registered network is not among the networks on which the call is allowed, or if the service for the registered network is lost, then the call manager selects one of the other "allowed" networks for re-registration in step 412. In that case, the call manager first determines whether any other networks were identified as "allowed" by the identification algorithm output and, if so, determines whether any of those networks are among the service compatible networks. Once an alternative network is selected, the call manager will de-register the communications device from the current network and attempt to register with the new selected network in step 414. If the call manager is unsuccessful in registering the communications device with the new selected network, the call manager will select another network for registration among the service compatible networks in step 412. Finally, the call manager will attempt to originate a call over the registered network in step 416.

Figure 5:
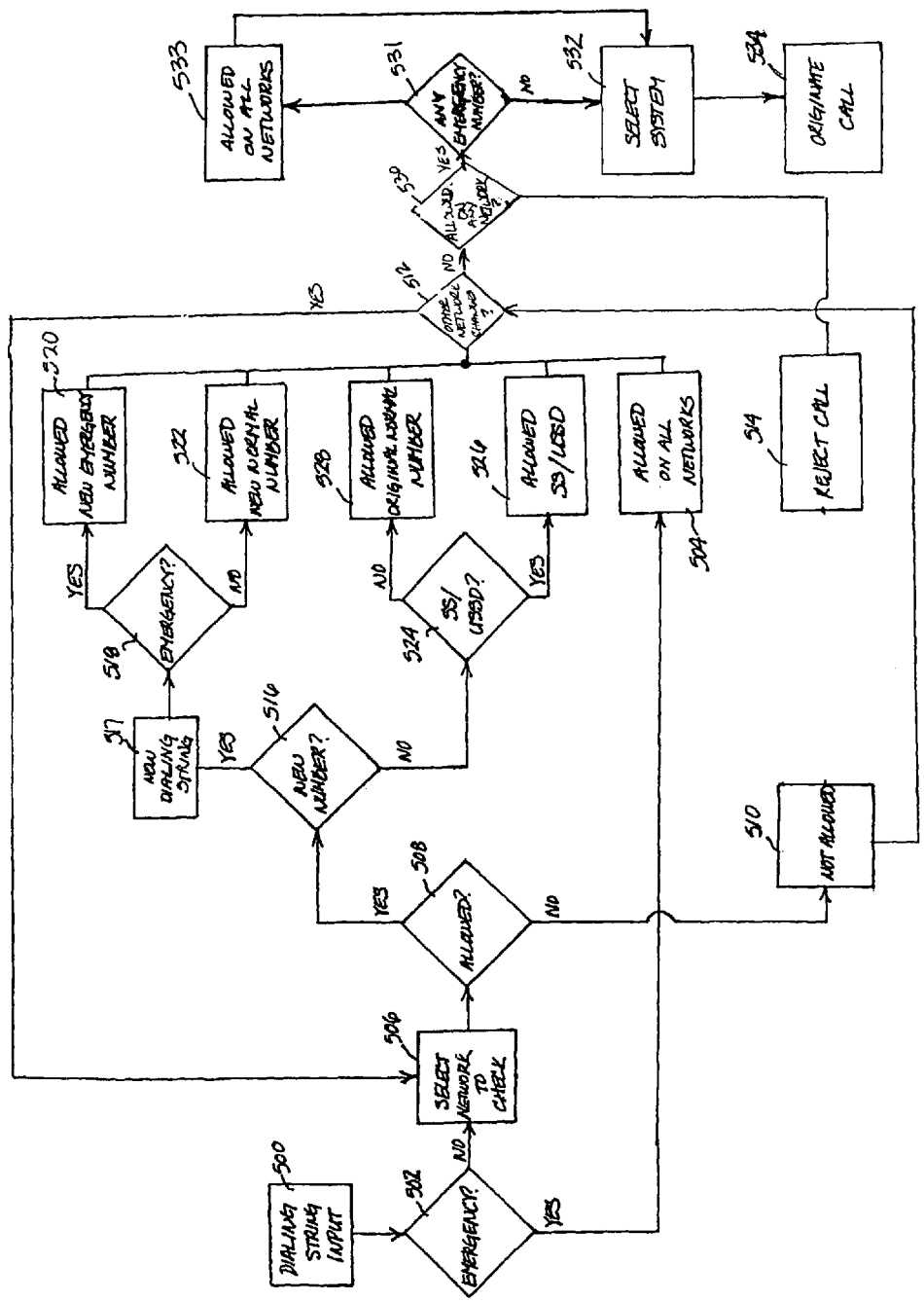
FIG. 5 is a flow diagram illustrating an exemplary identification algorithm implemented by the exemplary call manager.

FIG. 5 is a flow diagram illustrating an exemplary identification algorithm whose output is utilized by the call manager described above. The identification algorithm implements a method for identifying which of the networks that a communications device is compatible with will be allowed by the communications device to support a dialed call. The identification algorithm also implements a procedure for formatting the call origination request so that the call may be originated on different networks. A communications device may operate on certain networks by means of a communications card adapted to a particular network or group of networks. A communications device may also have multiple such cards, enabling it to operate on multiple networks or groups of networks. For example, a communications device may simultaneously support both a SIM (Subscriber Identity Module) card enabling it to operate on GSM and GPRS networks, a R-UIM (Removable User Identity Module) card enabling it to operate on a CDMA network or hybrid CDMA/GSM network, and a USIM (UTMS SIM) card enabling it to operate on a UMTS network. Of course, it is to be understood that the invention is not limited to any particular type of card or card combination, but is applicable to communications devices that may be adapted to operate on any of a plurality of existing or later-developed wireless networks.

When a user's call origination request is received (as indicated at block 404 in FIG. 4), the identification algorithm illustrated in FIG. 5 accepts the user's dialing string as an input at block 500. At block 502, the algorithm considers whether the dialing string input indicates an emergency number. For example, in certain areas of the United States, a dialing string comprising the digit sequence "911" indicates an emergency number. If the request is for an emergency call, the call manager marks the call "allowed" for all available networks at block 504, indicating that the call may be originated on any available and service compatible network. A service compatible network is one that is compatible with a communications card within the communications device. The algorithm may skip the remaining usual steps in the case of an emergency call, direct the call manager to originate the emergency call on the currently registered network, and continue to attempt call origination on any available network until the call is successfully placed. If, on the other hand, it is determined at block 502 that the call origination request does not comprise an emergency number, then at block 506 the algorithm selects one card from a plurality of communications cards and proceeds to test and format the call origination request so that the call can be rejected from or placed on the network that is compatible with the selected card.

At block 508, it is determined whether the call request is allowed for the selected card. A call may be allowed, for example, if the dialing string input received with the call origination request is contained in a fixed dialing list that a user has programmed into the communications card. Such a situation may occur, for example, when a parent provides a wireless communications device to a child and programs the communications card to only allow the child to dial certain telephone numbers. This has the effect of causing the communications device to operate only for the purpose of dialing those numbers. Of course, there are other situations in which such a permissive dialing list might be created. Thus, at block 508, information such as fixed dialing lists, blocked call lists, or other user-defined information is accessed for the purpose of comparing the dialing string input to the information and determining whether the call is allowed. If it is determined at block 508 that the call is not allowed, for example because the dialing string does not represent a number included on a fixed dialing list, or represents a number included on a blocked call list, then at block 510 the call is marked "not allowed" for networks compatible with the selected card. At block 512 it is queried whether additional networks, compatible with other communications cards within the communications device, are available to support the call. If not, the call is rejected at block 514 and the call is never originated. Otherwise, the algorithm returns to block 506, where the next card and its compatible networks are selected to test for its availability to support the call. Such a situation may occur when a communications device includes two separate communications cards, each having its own fixed dialing list such that a phone number represented by the dialing string input appears on one of the lists but not on the other. In that case, the call would be "not allowed" for the networks accessible with one of the cards, but may be allowed on the networks accessible with the other card.

Returning to block 506, in the event that the call request is deemed allowed for the first selected card, the algorithm checks at block 516 whether the dialing string must be converted to a new number. For example, if the dialing string input received at block 500 represents a pre-set command programmed by the user into the communications card to represent a frequently-used telephone number, it must be converted to a new dialing string representative of the actual telephone number. Or, it may need to be converted so that it includes appropriate digits for being placed as a long distance call. If, for any reason, it is determined that the dialing string must be converted, then it is converted to a new dialing string at block 517, and at block 518 the new dialing string is checked to determine whether it is an emergency number. If so, the call is marked at block 520 to indicate that it is an "allowed new emergency number" for the selected mode. This may occur if the dialing string represents a user-defined code for an emergency number. That user defined-emergency code must then be changed to an actual emergency number, and this number will be recognized at block 518 as an emergency number. Otherwise, the call is marked at block 522 to indicate that it is an "allowed new normal number" for the selected card, wherein "normal" denotes that the call is not an emergency call.

Returning to block 516, if it were instead determined that the dialing string input did not need to be converted to a new number, then at block 524 the algorithm queries whether the dialing string input represents a SS (Supplementary Service request) or a USSD (Unstructured SS Data request). For example, certain information within a dialing string may indicate to a carrier associated with the selected network that a service request is being dialed. In that event, the dialing string is converted to an SS or USSD request code and the call is marked at block 526 to indicate that it is an "allowed SS/USSD" for the selected network. Otherwise, the call is marked at block 528 to indicate that it is an "allowed original number" for networks compatible with the selected card.

In the exemplary identification algorithm described above, an incoming call request may have resulted in one of at least six different markings to indicate whether and in what form it was allowed on the selected card, as indicated at blocks 504, 514, 520, 522, 526 and 528. Moreover, in the event that a communications device comprises multiple communications cards, a call request may be marked with any combination of two or more of the markings that represent the conditions indicated at blocks 504, 514, 520, 522, 526 and 528. While the identification algorithm input comprises at least one data field, which contains the dialing string input, the output may comprise two or more data fields. One output data field contains a dialing string, which may be identical to the dialing string input or may be altered as a result of the algorithm's operative steps. A second data field may include one or more bits for indicating the marking conditions representative of the conditions indicated at blocks 504, 514, 520, 522, 526 and 528. The bits may be appropriately set according to the determinations of the identification algorithm. A third data field may include the same number of bits for marking the call as the second data field, with the difference between the two fields being the card or networks that the bits are set for. For example, a three-field selection algorithm output may include a dialing string in the first field, a set of bits in the second field set to indicate one of the marking conditions for a first network, and a set of bits in the second field set to indicate one of the marking conditions for a second network. Moreover, extra fields may be used to contain alternate dialing strings, which may be different in the algorithm output for each of the different communications cards. Alternatively, the selection algorithm may generate two or more separate outputs, one for each network. In that case, each output may comprise two data fields, one for the dialing string (whether original or changed) and one for the marking condition. Of course, those skilled in the art will recognize that other variations are possible, and that for any particular network, communications card, mobile device or combination thereof, a call origination request may require any of a number of different markings to indicate its ability to be originated on that network.

After the dialing string input has been accepted or altered and/or marked for the selected network, the algorithm checks at block 530 whether other networks are available in order to handle the call. If so, the algorithm returns to block 506 where the next network is selected. The same procedure previously described is then followed for the newly selected network, and this process continues until the call has been appropriately marked for each available network that the communications device is compatible with. Once each network or card has been considered, it will be determined at block 530 that no further networks are available. At block 531, the algorithm considers whether any of the calls have been marked as an emergency call. For example, a call marked at block 520 is one that has had its dialing string changed such that the new dialing string indicates an emergency call. If, at block 531, it is determined that there is an emergency call, then the call is marked at block 533 as allowed on all networks.

At block 532, the various markings generated for each iteration of the algorithm as described above are considered. The algorithm selects an appropriate network on which the call is to be originated as a function of the markings. For example, if a call is marked allowed for a first network and marked allowed for a second network, the algorithm may direct the call manager to originate the call on whichever one of the first or second networks is currently registered. As another example, if a call is marked allowed on a first network and rejected on a second network, but the second network is the currently active one, the algorithm may direct the call manager to disconnect the second network, re-register the first network, and originate the call on the now-active first network. Or, if the call has been marked as an emergency, it is allowed on all networks and will therefore be originated on the currently registered network.

Of course, additional examples regarding how a network may be selected at block 532, including the consideration of various markings that may have been generated at blocks 520, 522, 528, 526, 504 and 533, are also possible. For example, when the dialing input string comprises an emergency number, the algorithm may, at block 532, direct the call manager to attempt to originate the call on the current active network. If the origination attempt fails after a certain amount of time, which may be set for example by the network carrier, the communications device manufacturer, or some other source, the algorithm may direct the call manager to retain the current network as the active network and repeat the call origination request, or may direct the call manager to disconnect from the current network, switch to a new active network, and attempt to originate the call on the new active network. The call manager may repeat either situation, or any combination of these situations, until the emergency call is successfully originated on a compatible network.

In a second possible case, the dialing input string may be changed to a new emergency number for a first communications card, and either changed to a new normal number or retained as the original normal number for a second communications card. In this case, the algorithm may direct the call manager to originate the emergency call on the network compatible with the first communications card. If that is the currently active network, the call may be originated immediately. Otherwise, the call manager may disconnect from the active network, register the network compatible with the first call, and then attempt to originate the emergency call on the now-active network. As described above, the emergency call may be originated via a series of origination attempts, each of which may time out after a predetermined length of time. Alternatively, if an attempt to originate the emergency call fails, the call manager may switch to the other network, and attempt to originate the call using the normal number, whether it has been changed by the algorithm or retained as the original dialing string input. Whichever network is used, and whether the dialing string is a normal or emergency dialing string, the call origination may be made transparent to the user of the communications device. For example, a user interface may display the call origination on either network as an "emergency call." At the end of the call, the call manager may either remain on the active network, or switch to another network compatible with the communications device's other communications card, according to a system selection preference. Such preference may be determined by the user, or by default settings made by the communications device manufacturer, or by some other method.

In another case, the algorithm may cause the dialing string input to be changed to a new emergency number for a first communications card, and either changed to an SS or USSD, or rejected, for a second communications card. In this case, the algorithm may cause the call manager to originate the emergency number on the network compatible with the first communications card as described above. Alternatively, the call manager may alternate between attempts to originate the emergency call on the network compatible with the first communications card, and attempts to originate the SS or USSD call on the network compatible with the second communications card.

In yet another case, the dialing string input may be changed by the algorithm to a new emergency number for each of two different cards in the communications device. In this case, the algorithm may direct the call manager to attempt to originate the emergency call on whichever network is currently active. If the call origination attempt fails, the call manager may either re-attempt to originate the call, or switch to the network compatible with the other communications card, and attempt to originate the call using the other emergency number on the now-registered network. Subsequent origination attempts, whether sequentially on the same network, alternating between multiple networks, or some combination thereof, may continue until the emergency call is successfully originated. At the end of the call, the call manager may insure registration or re-registration of the originally active network, or may retain the currently active network, according to system selection preference.

In a similar case, the dialing string input may be a normal number for each of two communications cards, and may be unchanged by the algorithm. As the above case, where the number was an emergency number for both cards, the call manager may attempt to originate the call on the currently active network, and may make any subsequent origination attempts either on the same network or by alternating between compatible networks. After the call is terminated, the call manager causes the communications device to have either network registered, according to system selection preference.

In yet another possible case, the dialing string input may be rejected on a first communications card, but accepted or changed to a new normal number, SS or USSD on a second card. In such a case, the call manager may attempt to originate the SS or USSD on the network compatible with the second card, whether that network is currently active or must be registered first. The call manager may repeat origination attempts until the SS or USSD call is placed, and then cause either of the networks to be registered after termination of the call, according to system selection preference.

Still another possibility is that the dialing string input is rejected by the algorithm for both communications cards. In this case, the call is simply rejected, and no origination attempt is made for either network.

Of course, it is to be understood that for a plurality of networks with which a communications device may be compatible (i.e. multiple communications cards), and the plurality of possible markings, exemplary ones of which have been described above, a large number of variations and combinations of markings are possible for any received call request. It is also to be understood that while the exemplary scenarios described above involved two communications cards and two networks, the concepts of the present invention are applicable to communications devices that house any other number of communications cards and are compatible with any number of communications networks. While the exemplary algorithm may generally proceed to place emergency calls on any available network immediately, or to select currently active networks for placing allowed calls first, any order of network selection may be implemented. Such implementation may be a function of various criteria such as efficiency, user preference, and the like. Whichever network is ultimately selected for handling the call, at block 534 (as also indicated at block 410 in FIG. 4), the call is originated on the selected network.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications, comprising:
registering with a preferred network;
receiving an origination request for a call, the origination request comprising a service parameter and a dialing string;
determining a marking condition for the dialing string to indicate a supportability and form of the call on each of a plurality of communications networks, comprising:
generating a first marking to indicate that the call is allowed on each of the plurality of communications networks upon determining that the dialing string indicates an emergency number,
accessing and comparing against user-defined permission information to determine if the call is allowed on each of the plurality of communications networks upon determining that the dialing string excludes the emergency number,
generating a second marking to prohibit the call upon determining that the call is not allowed on any of the plurality of communications networks, and
generating a third marking to indicate the dialing string or a converted dialing string based on the user-defined permission information or a service request code of the call upon determining that the call is allowed on one of the plurality of communications networks;
identifying compatible communications networks from the plurality of communications networks to support the call as a function of the first, second and third marking conditions for the dialing string;
determining whether the call is allowed or not allowed on the registered network;
originating the call on the registered network when it is determined that the call is allowed on the registered network; and
registering with another of the identified compatible networks and originating the call when it is determined that the call is not allowed on the registered network.

2. The method of claim 1, wherein the identifying comprises accessing information from at least one of a SIM card, an R-UIM card, and a USIM card.

3. The method of claim 2, wherein the information is at least assessed in connection with user-defined permission information pre-programmed into the at least one of a SIM card, an R-UIM card, and a USIM card.

4. The method of claim 1, wherein the service parameter at least indicates a type of service requested and a quality of service for supporting the call.

5. The method of claim 1, wherein the user-defined permission information comprises at least one of a fixed dialing list indicating one or more phone numbers allowed on a particular communications network or a block list indicating one or more phone numbers that are not allowed on a particular communications network.

6. The method of claim 5, wherein the fixed dialing list and the block list are programmed by a user into a communications card within a communications device.

7. The method of claim 1, further comprising determining whether the dialing string needs to be converted to a new number, and executing an identification algorithm to format the dialing string into the converted dialing string when it is determined that the dialing string needs to be converted.

8. The method of claim 1, further comprising:
generating two or more output data fields, a first of the two or more output data fields comprising the dialing string, or
if the third marking has been generated, generating the converted dialing string, a second of the two or more output data fields comprising one or more bits for indicating the first, second, and third markings.

9. A communications device, comprising:
means for registering with a preferred network;
means for receiving an origination request for a call, the origination request comprising a service parameter and a dialing string;
means for determining a marking condition for the dialing string to indicate a supportability and form of the call on each of a plurality of communications networks, comprising:
means for generating a first marking to indicate that the call is allowed on each of the plurality of communications networks upon determining that the dialing string indicates an emergency number,
means for accessing and comparing against user-defined permission information to determine if the call is allowed on each of the plurality of communications networks upon determining that the dialing string excludes the emergency number,
means for generating a second marking to prohibit the call upon determining that the call is not allowed on any of the plurality of communications networks, and
means for generating a third marking to indicate the dialing string or a converted dialing string based on the user-defined permission information or a service request code of the call upon determining that the call is allowed on one of the plurality of communications networks;
means for identifying compatible communications networks from the plurality of communications networks to support the call as a function of the first, second and third marking conditions for the dialing string;
means for determining whether the call is allowed or not allowed on the registered network;
means for originating the call on the registered network when it is determined that the call is allowed on the registered network; and
means for registering with another of the identified compatible networks and means for originating the call when it is determined that the call is not allowed on the registered network.

10. The communications device of claim 9, wherein the means for identifying comprises means for accessing information from at least one of a SIM card, an R-UIM card, and a USIM card.

11. The communications device of claim 10, wherein the information is at least assessed in connection with user-defined permission information pre-programmed into the at least one of a SIM card, an R-UIM card, and a USIM card.

12. The communications device of claim 9, wherein the service parameter at least indicates a type of service requested and a quality of service for supporting the call.

13. The communications device of claim 9, wherein the user-defined permission information comprises at least one of a fixed dialing list indicating one or more phone numbers allowed on a particular communications network or a block list indicating one or more phone numbers that are not allowed on a particular communications network.

14. The communications device of claim 13, wherein the fixed dialing list and the block list are programmed by a user into a communications card within the communications device.

15. The communications device of claim 9, further comprising means for determining whether the dialing string needs to be converted to a new number, and means for executing an identification algorithm to format the dialing string into the converted dialing string when it is determined that the dialing string needs to be converted.

16. The communications device of claim 9, further comprising:
means for generating two or more output data fields, a first of the two or more output data fields comprising the dialing string, or
if the third marking has been generated, means for generating the converted dialing string, a second of the two or more output data fields comprising one or more bits for indicating the first, second, and third markings.

17. A communications device, comprising:
at least one processor configured to:
register with a preferred network;
receive an origination request for a call, the origination request comprising a service parameter and a dialing string;
determine a marking condition for the dialing string to indicate a supportability and form of the call on each of a plurality of communications networks, comprising:
generating a first marking to indicate that the call is allowed on each of the plurality of communications networks upon determining that the dialing string indicates an emergency number,
accessing and comparing against user-defined permission information to determine if the call is allowed on each of the plurality of communications networks upon determining that the dialing string excludes the emergency number,
generating a second marking to prohibit the call upon determining that the call is not allowed on any of the plurality of communications networks, and
generating a third marking to indicate the dialing string or a converted dialing string based on the user-defined permission information or a service request code of the call upon determining that the call is allowed on one of the plurality of communications networks;
identify compatible communications networks from the plurality of communications networks to support the call as a function of the first, second and third marking conditions for the dialing string;
determine whether the call is allowed or not allowed on the registered network;
originate the call on the registered network when it is determined that the call is allowed on the registered network; and
register with another of the identified compatible networks and originate the call when it is determined that the call is not allowed on the registered network.

18. The communications device of claim 17, wherein the at least one processor is configured to access information from at least one of a SIM card, an R-UIM card, and a USIM card.

19. The communications device of claim 18, wherein the user-defined permission information is pre-programmed into the at least one of a SIM card, an R-UIM card, and a USIM card.

20. The communications device of claim 17, wherein the service parameter at least indicates a type of service requested and a quality of service for supporting the call.

21. The communications device of claim 17, wherein the user-defined permission information comprises at least one of a fixed dialing list indicating one or more phone numbers allowed on a particular communications network or a block list indicating one or more phone numbers that are not allowed on a particular communications network.

22. The communications device of claim 21, wherein the fixed dialing list and the block list are programmed by a user into a communications card within the communications device.

23. The communications device of claim 17, wherein the at least one processor is further configured to determine whether the dialing string needs to be converted to a new number, and execute an identification algorithm to format the dialing string into the converted dialing string when it is determined that the dialing string needs to be converted.

24. The communications device of claim 17, wherein the at least one processor is further configured to:
generate two or more output data fields, a first of the two or more output data fields comprising the dialing string, or
if the third marking has been generated, generate the converted dialing string, a second of the two or more output data fields comprising one or more bits for indicating the first, second, and third markings.

25. A computer program product, comprising:
a non-transitory computer-readable medium embodying codes executable to:
register with a preferred network;
receive an origination request for a call, the origination request comprising a service parameter and a dialing string;
determine a marking condition for the dialing string to indicate a supportability and form of the call on each of a plurality of communications networks, comprising:
generating a first marking to indicate that the call is allowed on each of the plurality of communications networks upon determining that the dialing string indicates an emergency number,
accessing and comparing against user-defined permission information to determine if the call is allowed on each of the plurality of communications networks upon determining that the dialing string excludes the emergency number,
generating a second marking to prohibit the call upon determining that the call is not allowed on any of the plurality of communications networks, and
generating a third marking to indicate the dialing string or a converted dialing string based on the user-defined permission information or a service request code of the call upon determining that the call is allowed on one of the plurality of communications networks;
identify compatible communications networks from the plurality of communications networks to support the call as a function of the first, second and third marking conditions for the dialing string;
determine whether the call is allowed or not allowed on the registered network;
originate the call on the registered network when it is determined that the call is allowed on the registered network; and
register with another of the identified compatible networks and originate the call when it is determined that the call is not allowed on the registered network.

26. The computer program product of claim 25, wherein the codes executable to identify compatible communications networks comprises codes executable to access information from at least one of a SIM card, an R-UIM card, and a USIM card.

27. The computer program product of claim 26, wherein the information is at least assessed in connection with the user-defined permission information pre-programmed into the at least one of a SIM card, an R-UIM card, and a USIM card.

28. The computer program product of claim 25, wherein the service parameter at least indicates a type of service requested and a quality of service for supporting the call.

29. The computer program product of claim 25, wherein the user-defined permission information comprises at least one of a fixed dialing list indicating one or more phone numbers allowed on a particular communications network or a block list indicating one or more phone numbers that are not allowed on a particular communications network.

30. The computer program product of claim 29, wherein the fixed dialing list and the block list are programmed by a user into a communications card within a communications device.

31. The computer program product of claim 25, further comprising codes executable to determine whether the dialing string needs to be converted to a new number, and execute an identification algorithm to format the dialing string into the converted dialing string when it is determined that the dialing string needs to be converted.

32. The computer program product of claim 25, further comprising codes executable to:
generate two or more output data fields, a first of the two or more output data fields comprising the dialing string, or
if the third marking has been generated, generate the converted dialing string, a second of the two or more output data fields comprising one or more bits for indicating the first, second, and third markings.

* * * * *